United States Patent
Jung et al.

(10) Patent No.: US 12,362,628 B2
(45) Date of Patent: Jul. 15, 2025

(54) BLOWER MOTOR

(71) Applicant: Hyoseong Electric, Co., Ltd., Busan (KR)

(72) Inventors: Jin Gun Jung, Busan (KR); Chi Won Moon, Busan (KR); Seokmin Kim, Busan (KR)

(73) Assignee: Hyoseong Electric, Co., Ltd., Busan (KR)

( * ) Notice: Subject to any disclaimer, the term of this patent is extended or adjusted under 35 U.S.C. 154(b) by 0 days.

(21) Appl. No.: 18/617,837

(22) Filed: Mar. 27, 2024

(65) Prior Publication Data
US 2024/0333088 A1    Oct. 3, 2024

(30) Foreign Application Priority Data

Mar. 29, 2023  (KR) .................. 10-2023-0041301

(51) Int. Cl.
*H02K 5/24* (2006.01)
*H02K 11/33* (2016.01)
*H02K 21/22* (2006.01)

(52) U.S. Cl.
CPC .............. *H02K 5/24* (2013.01); *H02K 11/33* (2016.01); *H02K 21/22* (2013.01); *H02K 2211/03* (2013.01)

(58) Field of Classification Search
CPC .......... H02K 11/33; H02K 21/22; H02K 5/24; H02K 5/04; H02K 9/06; H02K 2211/03; H02K 5/00; H02K 5/06; H02K 5/15; H02K 5/26

USPC ........................................................ 310/89
See application file for complete search history.

(56) References Cited

U.S. PATENT DOCUMENTS

| | | | |
|---|---|---|---|
| 9,103,349 B2 | 8/2015 | Oi et al. | |
| 2012/0074802 A1* | 3/2012 | Oi | H02K 5/10 310/67 R |
| 2016/0226335 A1* | 8/2016 | Nicoloff | F16M 13/02 |
| 2018/0226857 A1* | 8/2018 | Ishizaki | F04D 29/668 |

FOREIGN PATENT DOCUMENTS

| | | |
|---|---|---|
| CN | 204732999 U | 10/2015 |
| CN | 215911976 U | 2/2022 |
| DE | 102011082506 A1 | 3/2013 |
| JP | 06-217489 A | 8/1994 |
| KR | 10-2018-0065631 A | 6/2018 |
| KR | 10-1873979 B1 | 9/2018 |
| KR | 10-2020-0007145 A | 1/2020 |
| KR | 10-2183072 B1 | 11/2020 |

* cited by examiner

*Primary Examiner* — Alexander A Singh
(74) *Attorney, Agent, or Firm* — Revolution IP, PLLC

(57) ABSTRACT

A blower motor includes a motor assembly 100; a flange 200 on which the motor assembly 100 is mounted; and a damper plate 300 coupled to the flange 200 and supporting the motor assembly 100, wherein the motor assembly 100 includes: a stator assembly 20; a rotor assembly 30 disposed on an outer periphery of the stator assembly 20 and rotating with a shaft 10; a stator block 40 coupled to the stator assembly 20; a printed circuit board 50 installed in the stator block 40; and a motor cover 60 coupled to the stator block 40.

3 Claims, 12 Drawing Sheets

BLOWER MOTOR

BACKGROUND OF THE INVENTION

Technical Field

The present invention relates to a blower motor used in an air conditioning system for a vehicle, etc. More specifically, the present invention relates to a blower motor with a structure capable of shortening the manufacturing process for the blower motor to reduce the manufacturing costs of the motor and also improve the productivity thereof, and enhancing vibration absorption and coupling force to increase the efficiency and reliability of the motor.

Background Art

In general, vehicles need to introduce hot or cool air thereinto to control the temperature or humidity inside the vehicles, and the air for controlling the temperature and humidity is circulated by rotation of a blower fan. The blower fan is driven by a blower motor.

The blower motor includes a rotor, a stator and a housing accommodating the stator and the rotor. When current is applied to a coil wound around the stator core, the rotor is rotated by electromagnetic interaction with the stator, thereby rotating a fan assembly installed in a rotating shaft of the rotor, to perform air conditioning.

Korean Patent No. 10-1873979 discloses a motor in which a flange to which the blower motor is coupled and a heat sink are formed integrally by insert injection molding, thereby obtaining heat dissipation performance inside the housing, and also saving the time and costs required for assembling the housing and the heat sink.

The prior art discloses a technique for manufacturing a blower motor in which a motor assembly and a flange are coupled, comprising the following steps of assembling the motor assembly by coupling a stator with a rotor, seating the semi-assembled motor assembly on the flange formed integrally with a heat sink to be coupled therewith, assembling a PCB, etc. to the motor assembly, and coupling a motor cover to the motor assembly.

According to the prior art, components such as the PCB and motor cover are coupled to the motor assembly after the motor assembly which is not completely assembled is coupled to the flange. Accordingly, when the specifications of the flange change, the manufacturing cost increases because many processes wherein a jig with the flange mounted thereon is applied have to be modified.

Accordingly, in order to overcome the aforementioned problem, the present inventors suggest a blower motor with a novel structure of coupling a motor assembly manufactured according to a standardized process to a flange, which allows to change only the flange, without changing the overall process, and apply the same to the manufacturing process, when the specifications of the flange change, thereby reducing the manufacturing costs of the blower motor and also improving the productivity thereof.

SUMMARY OF THE INVENTION

Task to be Solved

It is an object of the present invention to provide a blower motor with a novel coupling structure of a flange and a motor assembly, which allows flanges of various specifications to be coupled to the standardized motor assembly, and streamlines the production process to reduce the manufacturing costs.

The above and other inherent objects of the present invention may all be easily achieved by the description of the present invention described below.

Means for Solving Task

The blower motor according to the present invention includes a motor assembly 100; a flange 200 on which the motor assembly 100 is mounted; and a damper plate 300 coupled to the flange 200 and supporting the motor assembly 100.

In the present invention, the motor assembly 100 may comprise a stator assembly 20; a rotor assembly 30 disposed on an outer periphery of the stator assembly 20 and rotating with a shaft 10; a stator block 40 coupled to the stator assembly 20; a printed circuit board 50 installed in the stator block 40; and a motor cover 60 coupled to the stator block 40.

Preferably, the motor cover 60 has a plurality of receiving spaces S1 on the outer periphery at regular intervals, and the damper plate 300 has a plurality of protruding supports 330 which are received in the respective receiving spaces S1.

In the present invention, the flange 200 may have a plurality of coupling protrusions 260 around a portion into which the motor assembly 100 is inserted at regular intervals, and the damper plate 300 may have a plurality of couplers 320 which are coupled to the respective coupling protrusions 260.

In the present invention, the damper plate 300 may comprise a ring-shaped body 310; a plurality of couplers 320 protruding upwardly from a periphery of the ring-shaped body 310 at regular intervals and having a coupling hole 321 in the center; and a protruding support 330 protruding inwardly of the ring-shaped body 310 in which the couplers 320 are arranged.

In the present invention, the damper plate 300 may be coupled to the flange 200 by inserting a coupling protrusion 260 in the flange 200 into the coupling hole 321 in the coupler 320 in a state where the motor assembly 100 is mounted on the flange 200.

In the present invention, the protruding support 330 in the damper plate 300 may support a receiving space S1 in the motor cover 60.

Effect of Invention

The present invention has an effect of providing a blower motor in which a motor assembly is coupled to a flange by a damper plate, thereby providing excellent assemblability, enabling the use of a motor assembly manufactured according to a standardized process, and reducing the manufacturing costs of the motor and also improving the productivity thereof.

Hereinafter, the present invention will be described in detail with reference to the accompanying drawings.

DETAILED DESCRIPTION OF THE INVENTION

Figure 1:
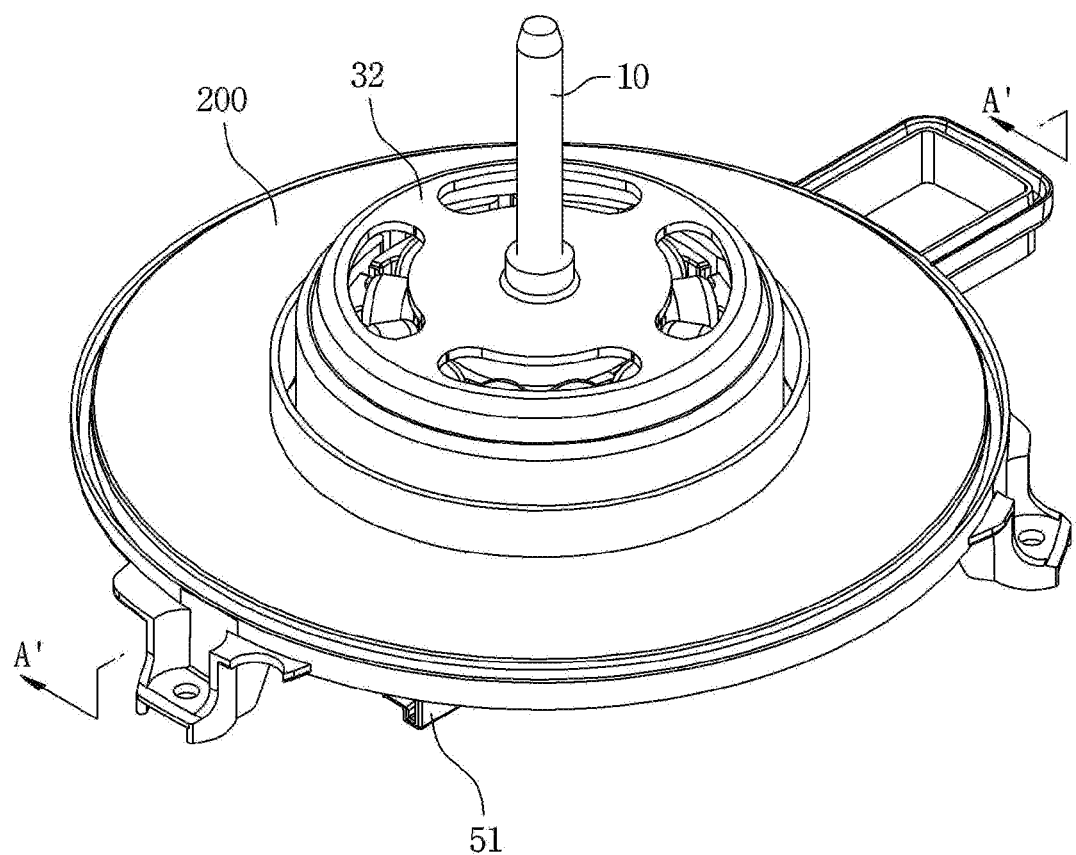
FIG. 1 is a perspective view of a blower motor according to the present invention.
Figure 2:
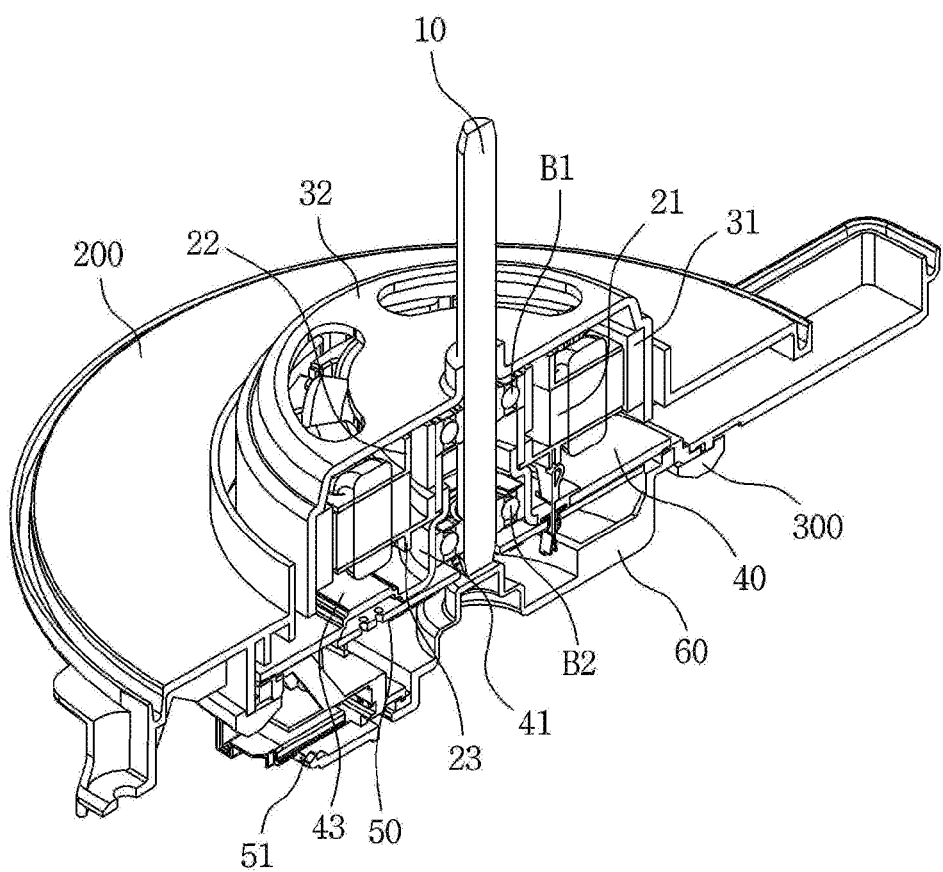
FIG. 2 is a cut-away perspective view of the blower motor in FIG. 1 taken along line A-A'.
Figure 3:
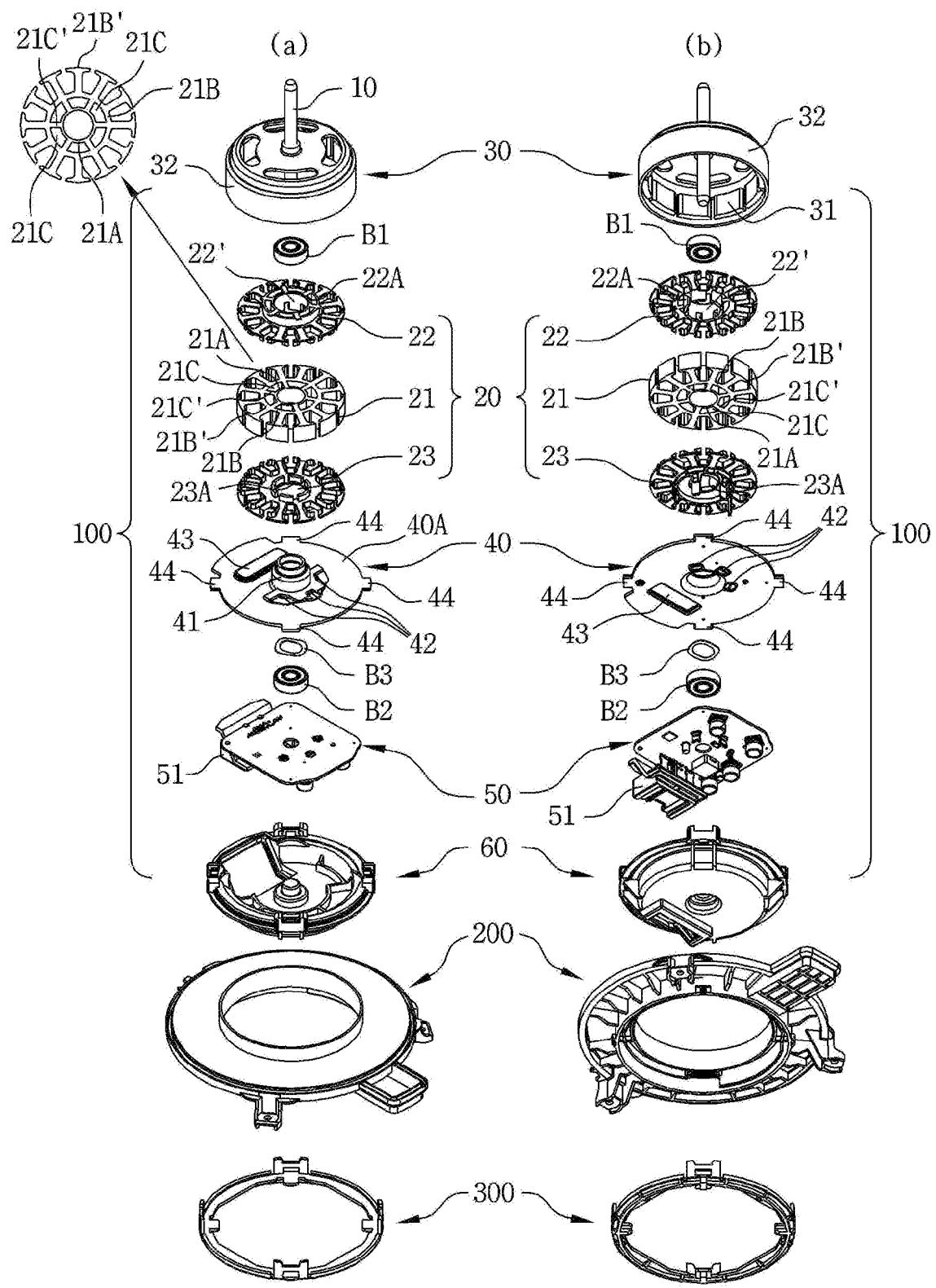
FIG. 3 is an exploded perspective view of a blower motor according to the present invention, (a) is a top exploded perspective view, and (b) is a bottom exploded perspective view.
Figure 4:
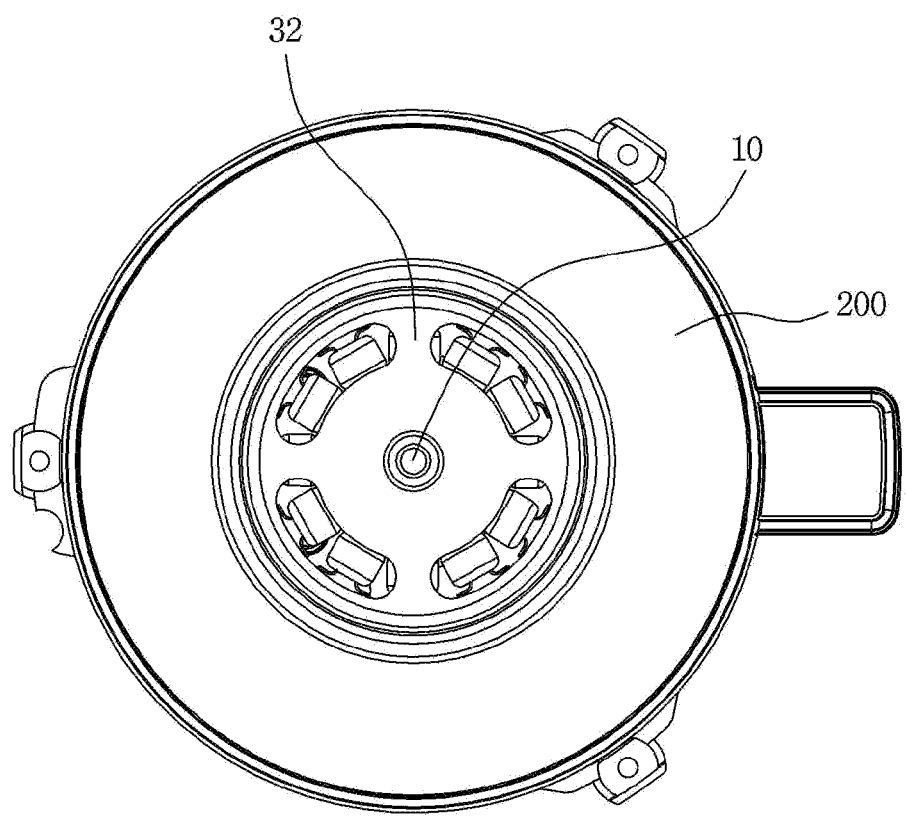
FIG. 4 is a top view of a blower motor according to the present invention.
Figure 5:
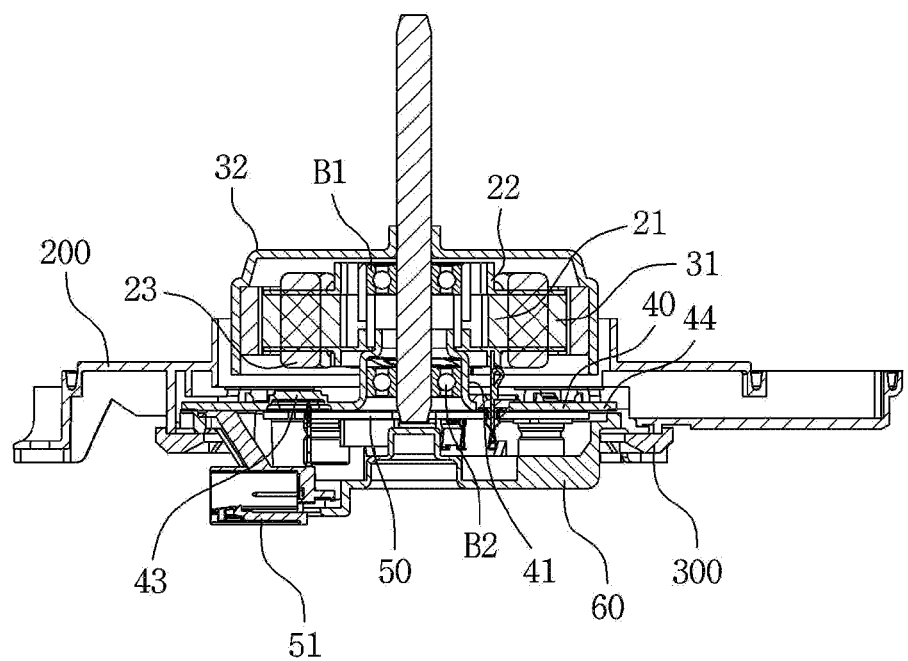
FIG. 5 is a cross-sectional view of the blower motor in FIG. 1 taken along line A-A'.

FIG. 1 is a perspective view of a blower motor according to the present invention. FIG. 2 is a cut-away perspective view of a portion of a blower motor according to the present invention. FIG. 3 is an exploded perspective view of a blower motor according to the present invention, (a) is a top exploded perspective view, and (b) is a bottom exploded perspective view. FIG. 4 is a top view of a blower motor according to the present invention. FIG. 5 is a cross-sectional view of a blower motor according to the present invention.

Referring to FIGS. 1 to 5 together, a motor assembly 100 of the blower motor according to the present invention comprises a stator assembly 20, a rotor assembly 30 disposed on an outer periphery of the stator assembly 20 and rotating with a shaft 10, a stator block 40 for seating the stator assembly 20, a printed circuit board 50 installed in the stator block 40, and a motor cover 60.

The stator assembly 20 comprises a stator core 21, an upper insulator 22 coupled to an upper portion of the stator core 21 and a lower insulator 23 coupled to a lower portion of the stator core 21.

The stator core 21 has a cylindrical body 21A in the center, a base 21B having a cylindrical shape around a periphery of the cylindrical body 21A, a plurality of teeth 21B' formed radially from the base 21B, and a plurality of air through holes 21C between an outer side of the cylindrical body 21A and an inner side of the base 21B. A rib 21C' for connecting an outer side of the cylindrical body 21A and an inner side of the base 21B may be formed in the air through hole 21C. Heat generated from the stator core 21 during operation of the blower motor may be cooled by air passing through the air through holes 21C.

The upper insulator 22 coupled to an upper portion of the stator core 21 has an upper bearing seating part 22A protruding upwardly from a central space 22'. An upper bearing B1 is installed in the upper bearing seating part 22A. The location of the upper bearing B1 in the upper insulator 22 of the stator assembly 20 makes the blower motor compact. The lower insulator 23 is coupled to a lower portion of the stator core 21 and has a central hole 23A in the center in communication with the hole in the center of the stator core 21.

The rotor assembly 30 comprises a plurality of magnets 31 and a rotor cover 32 having the magnets 31 attached along the inner periphery thereof. The shaft 10 is coupled to a center of the rotor cover 32 to rotate the rotor cover 32 by a magnetic force of the stator assembly 20 during operation of the blower motor, and the shaft 10 rotates with the rotor cover 32.

The stator assembly 20 is coupled to the stator block 40. The stator block 40 comprises a base plate 40A, a central protrusion 41 protruding upwardly from a center of the base plate 40A, a plurality of connections 42 in the base plate 40A around the central protrusion 41, a device groove 43 for receiving a device mounted on the printed circuit board 50, and a protruding locking piece 44 protruding radially from an outer periphery of the base plate 40A at regular intervals.

Without additional components necessary for heat dissipation and grounding, the stator block 40 alone performs heat dissipation and grounding. Accordingly, the stator block 40 is made of a material with excellent thermal and electrical conductivity, and is preferably made of aluminum.

The stator assembly 20 is coupled to the central protrusion 41 of the stator block 40. The central protrusion 41 is coupled to the hole in the center of the stator assembly 20. Accordingly, the stator assembly 20 can be coupled to the stator block 40 firmly, and at the same time, the heat generated from the printed circuit board 50 can be conducted toward the stator core 21, which performs heat dissipation.

A lower bearing B2 is coupled to an inner side of the central protrusion 41, and a wave washer B3 is coupled to an upper portion of the lower bearing B2, so that the lower bearing B2 can be firmly coupled to the inner side of the central protrusion 41.

The plurality of connections 42 are formed through the base plate 40A vertically around the central protrusion 41. The connection 42 through which a coil (not illustrated) wound around the stator assembly 20 passes provides a space electrically connected to the printed circuit board 50. The protruding locking piece 44 protrudes radially from an outer periphery of the base plate 40A at regular intervals, allowing the motor cover 60 to be coupled to the stator block 40.

The printed circuit board 50, on which various devices, a connector 51, etc., are mounted, is located at a lower portion of the stator block 40 and coupled to the motor cover 60. The connector 51 is connected to an external power source and a controller, etc. A ground terminal of the printed circuit board 50 is grounded to the base plate 40A of the stator block 40 to eliminate electrical noise, etc., occurring when operating the motor, thereby improving the electrical reliability of the motor. The device groove 43 receives a protruding portion of the printed circuit board 50.

Figure 6:
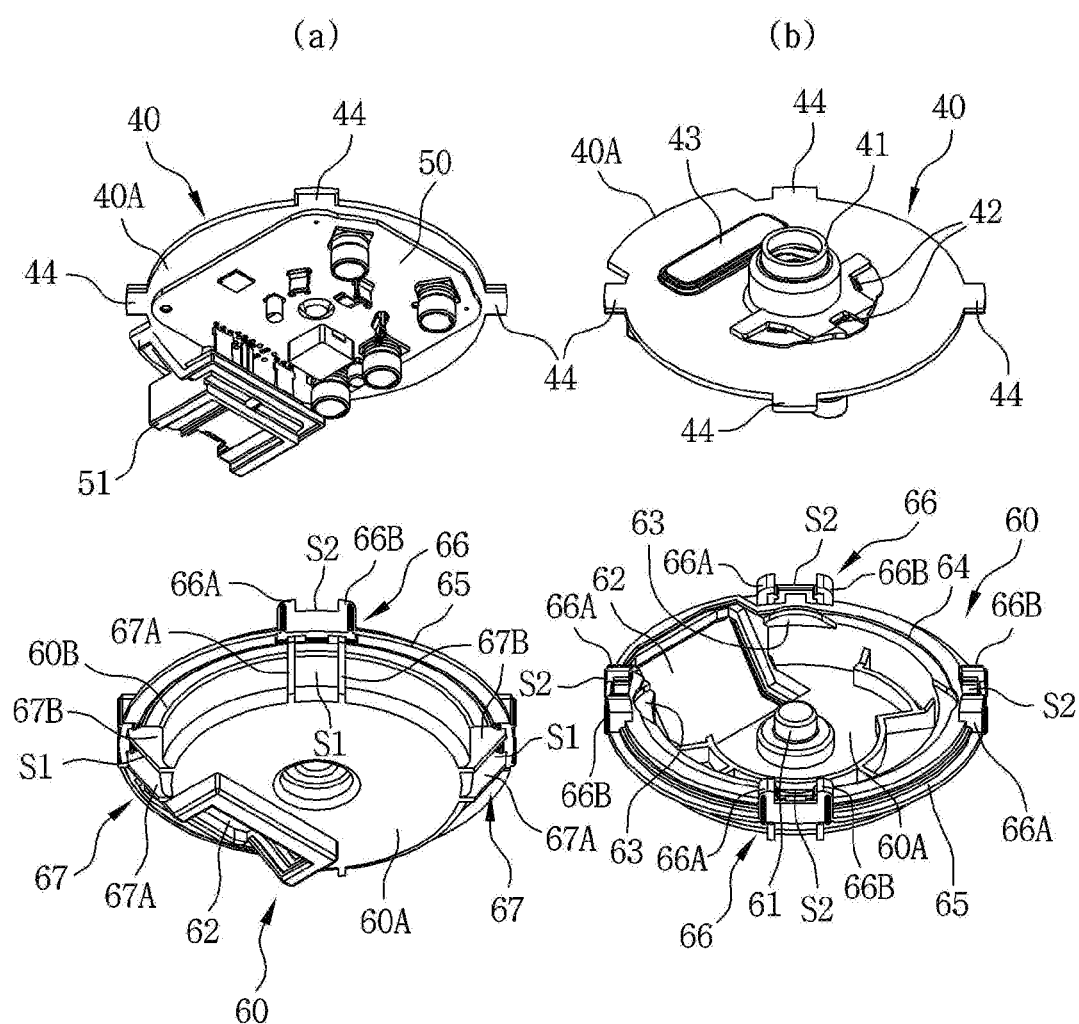
FIG. 6 is an exploded perspective view illustrating a stator block, a printed circuit board and a motor cover of a motor assembly of a blower motor according to the present invention, (a) is a bottom exploded perspective view, and (b) is a top exploded perspective view.
Figure 7:
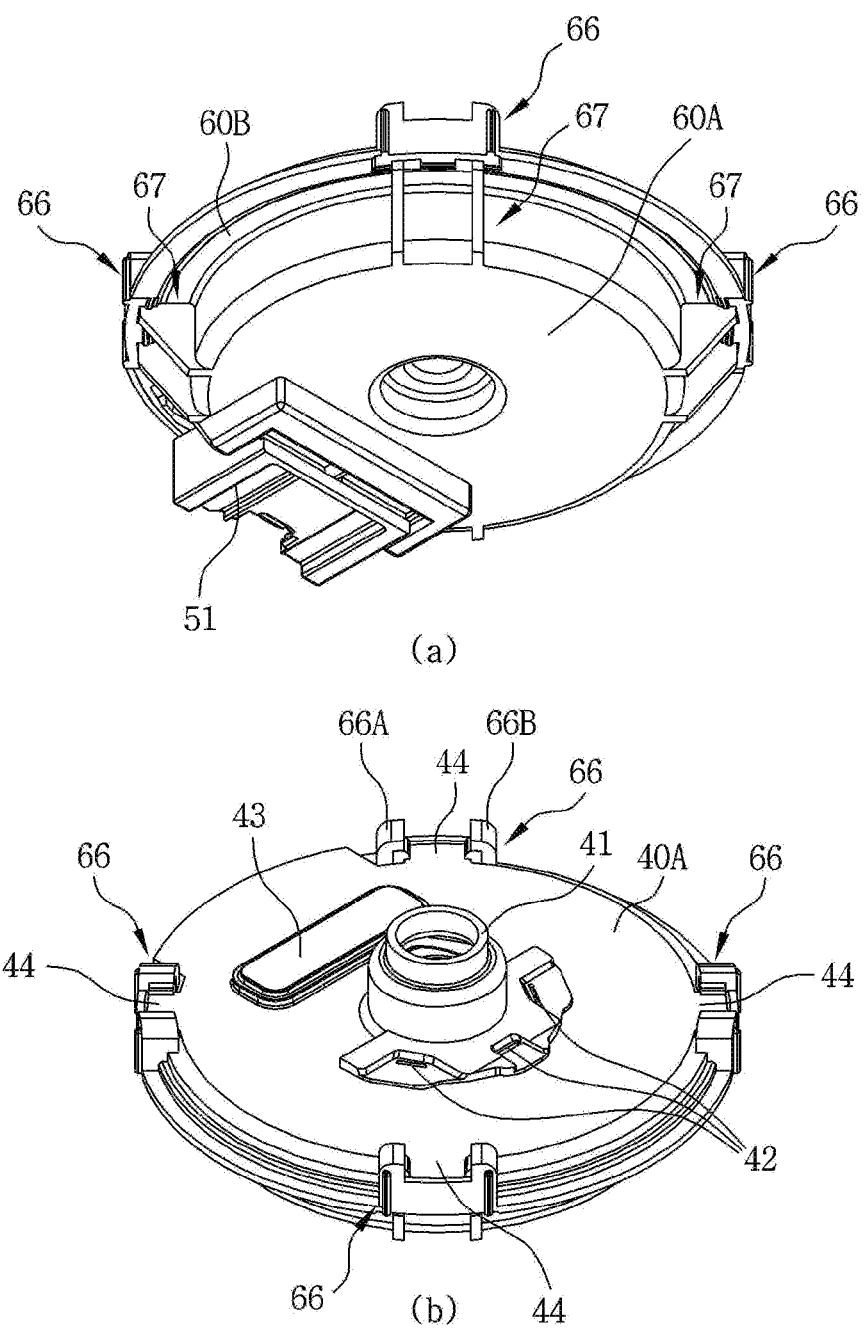
FIG. 7 is a perspective view illustrating a state in which a stator block, a printed circuit board and a motor cover of a motor assembly of the present invention are coupled, (a) is a bottom perspective view, and (b) is a top perspective view.

FIG. 6 is an exploded perspective view illustrating a stator block 40, a printed circuit board 50 and a motor cover 60 of a motor assembly 100 of a blower motor according to the present invention. FIG. 7 is a perspective view illustrating a state in which a stator block 40, a printed circuit board 50 and a motor cover 60 of a motor assembly 100 of the present invention are coupled, (a) is a bottom perspective view, and (b) is a top perspective view.

As illustrated in FIGS. 6 and 7, the motor cover 60 comprises a cover body 60A having a cup shape in which an upper portion is open, a support protrusion 61 protruding upwardly from a center of the cover body 60A, a connector insertion hole 62 on one side of the cover body 60A, a plurality of seating members 63 in an inner side of an upper rim 60B of the cover body 60A at regular intervals, a waterproof packing part 64 protruding upwardly along the upper rim 60B, an air leakage prevention packing part 65 along the upper rim 60B, a plurality of buffering members 66 for absorbing vibration protruding upwardly from an outer periphery of the upper rim 60B at regular intervals, and a coupling reinforcing rib 67 protruding from an outer periphery of the cover body 60A at regular intervals, wherein the coupling reinforcing rib 67 has a receiving space S1 between a reinforcing piece 67A and a reinforcing piece 67B, so that a protruding support 330 of the damper plate 300 to be described later is received therein.

The support protrusion 61 supports a lower end of the shaft 10 when a blower fan is coupled to an upper end of the shaft 10. The cover body 60A is injection molded from a synthetic resin material, and the seating member 63, waterproof packing part 64, air leakage prevention packing part 65 and buffering member 66 may be formed on the cover body 60A by double injection molding using an elastic material such as rubber. The connector 51 is coupled to the connector insertion hole 62 on one side of the cover body 60A.

Four corners of the printed circuit board 50 are seated on an upper surface of the seating member 63, allowing rigid coupling of the printed circuit board 50. The waterproof packing part 64 protrudes upwardly in the upper rim 60B of the cover body 60A, and seals the gap between the motor cover 60 and the stator block 40. The air leakage prevention packing part 65 seals the gap between the motor cover 60 and the flange 200. The sealing prevents water or moisture from penetrating into the inside of the motor assembly 100 from the outside and at the same time prevents air inside the blower motor from being discharged to the outside, thereby reducing the defect rate of the blower motor.

The buffering member 66 for absorbing vibration is configured such that two protrusions 66A, 66B protrude with an insertion space S2 interposed therebetween. The protruding locking piece 44 of the stator block 40 is coupled to the insertion space S2 between the two protrusions 66A, 66B.

Figure 8:
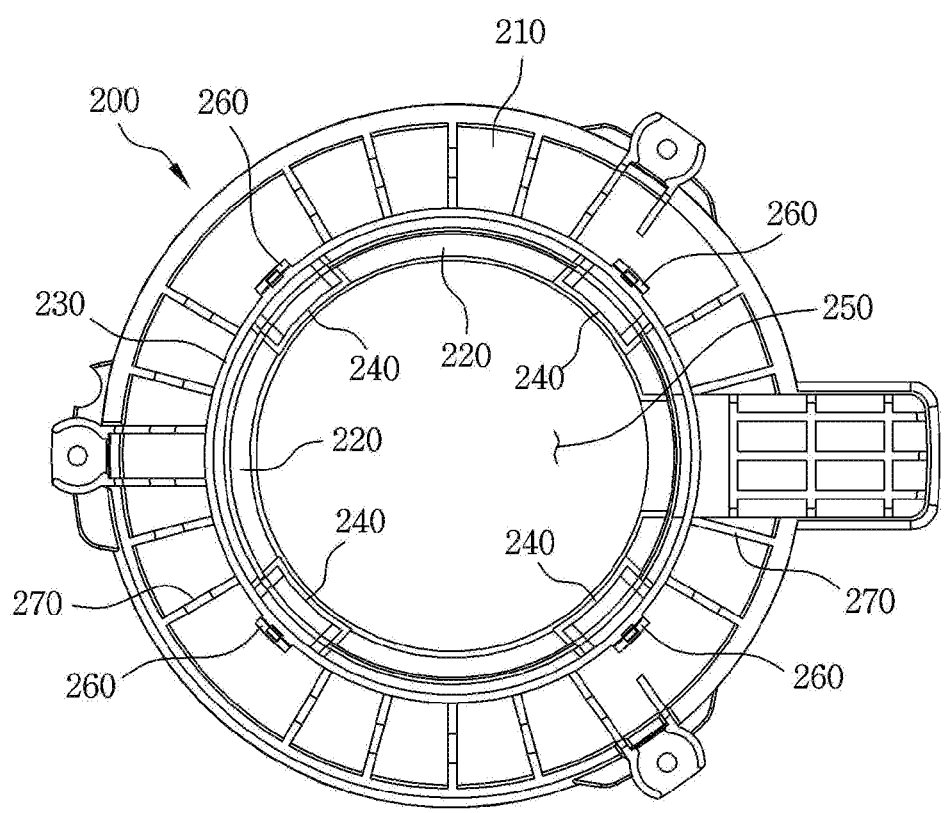
FIG. 8 is a bottom view of a flange of a blower motor according to the present invention.
Figure 9:
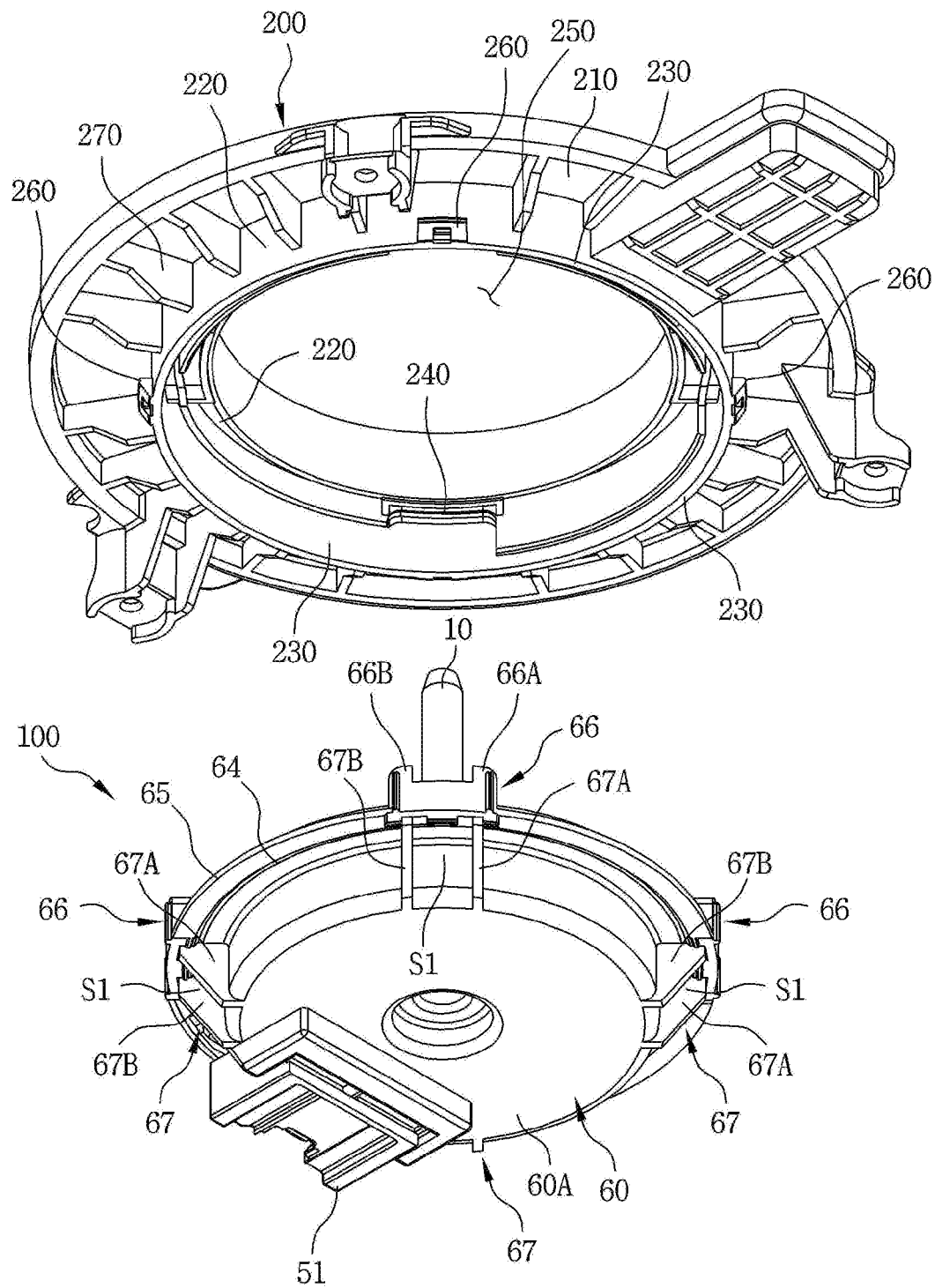
FIG. 9 is an exploded perspective view of a motor assembly and a flange according to the present invention.
Figure 10:
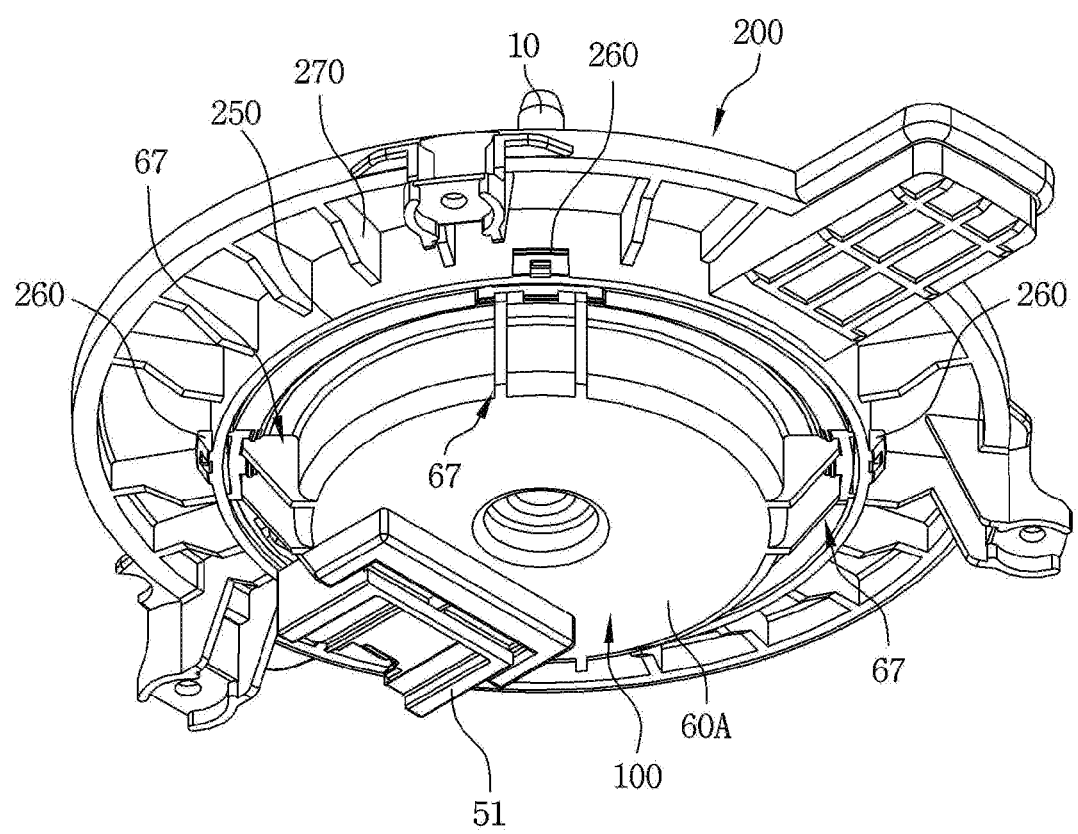
FIG. 10 is a perspective view illustrating a state in which a motor assembly and a flange according to the present invention are coupled.

FIG. 8 is a bottom view of a flange 200 of a blower motor according to the present invention. FIG. 9 is an exploded perspective view of a motor assembly 100 and a flange 200 according to the present invention. FIG. 10 is a perspective view illustrating a state in which a motor assembly 100 and a flange 200 according to the present invention are coupled.

Referring to FIGS. 8 to 10 together, the flange 200 comprises a flange body 210 having a ring shape, a hollow 250 which is an empty space in a central portion of the flange body 210, a stepped part 220 protruding toward a center from an inner circumferential surface of the hollow 250, a motor insertion part 230 extending downwardly along a periphery of the hollow 250, a plurality of seating grooves 240 in the stepped part 220 at regular intervals, a plurality of coupling protrusions 260 protruding outwardly from an outer circumferential surface of the motor insertion part 230 at regular intervals, and a plurality of support ribs 270 in a lower portion of the flange body 210 and in an outer circumferential surface of the motor insertion part 230.

The motor assembly 100 is inserted into an inner space of the motor insertion part 230. Specifically, a peripheral portion of the motor cover 60 of the motor assembly 100 is located in an inner space of the motor insertion part 230, wherein a plurality of buffering members 66 in the motor cover 60 are disposed in the seating grooves 240 at corresponding positions, respectively. The buffering member 66 is seated on the seating groove 240 to provide a decoupling structure between the flange 200 and the motor assembly 100. In other words, the flange 200 and the motor assembly 100 are not fixedly coupled to each other, but the motor assembly 100 is supported on the flange 200 by the buffering member 66. Accordingly, transmission of the vibration generated from the motor assembly 100 to the flange 200 may be prevented.

The damper plate 300 is used to fasten the motor assembly 100 and the flange 200 without separation. Hereinafter, a detailed description thereon will be provided.

Figure 11:
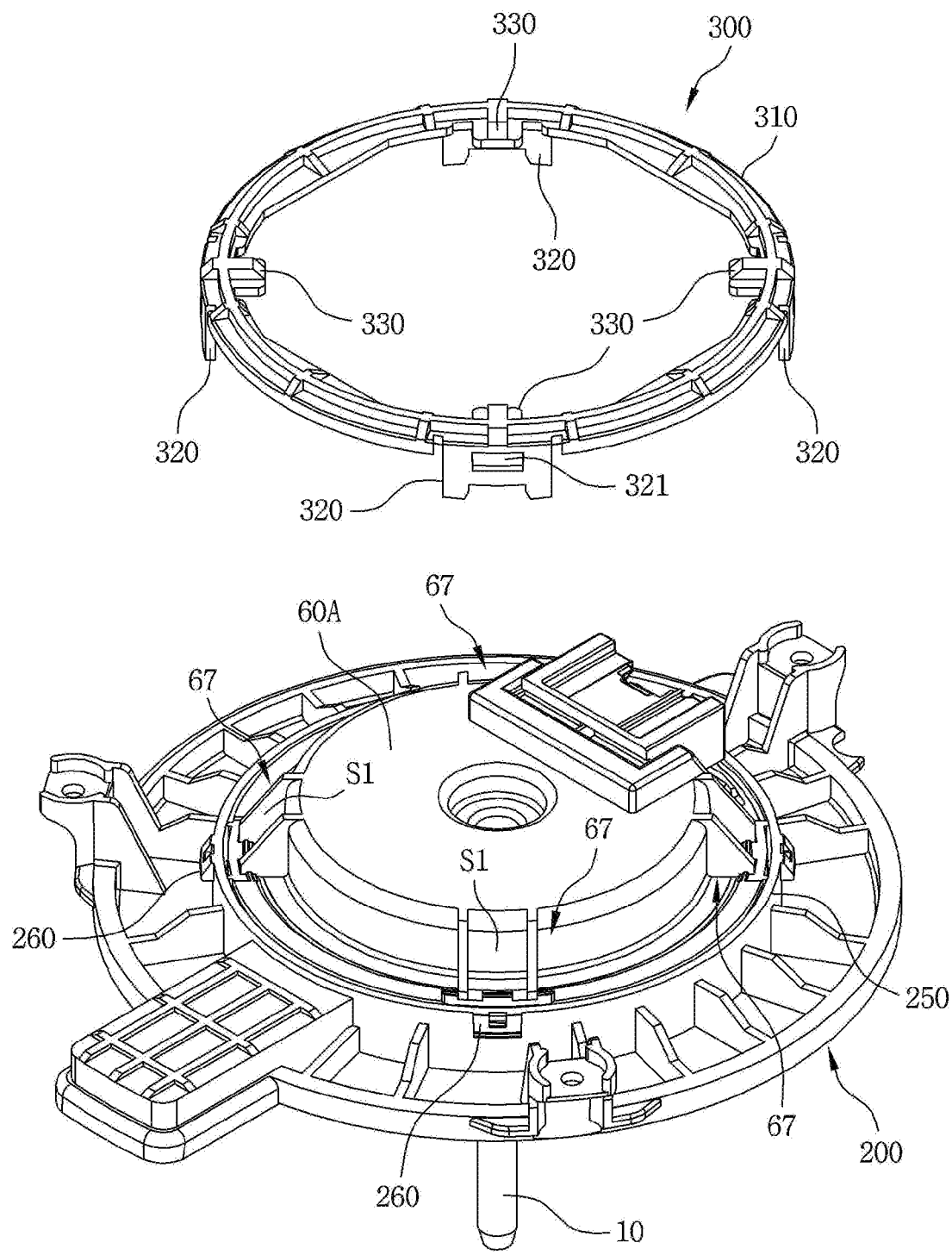
FIG. 11 is a perspective view illustrating a state before a damper plate is coupled while a motor assembly and a flange of a blower motor according to the present invention are coupled.
Figure 12:
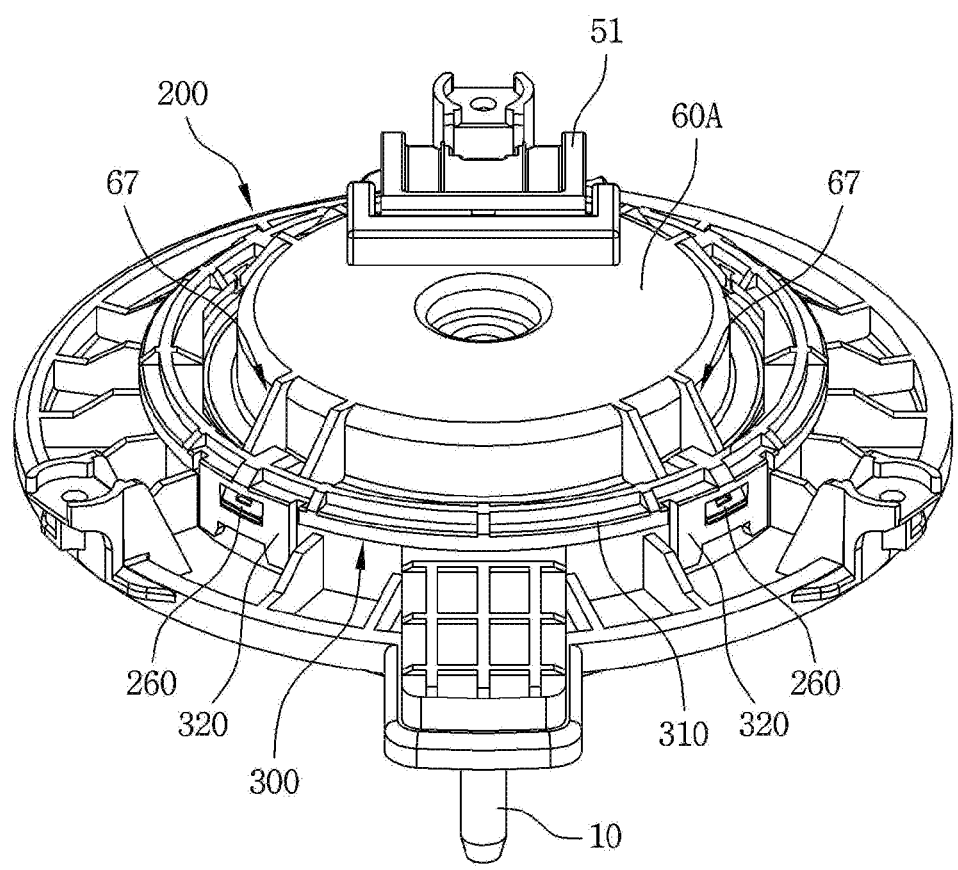
FIG. 12 is a perspective view of a blower motor according to the present invention illustrating a state in which a motor assembly and a flange are coupled by a damper plate.

FIG. 11 is a perspective view illustrating a state before a damper plate 300 is coupled while a motor assembly 100 and a flange 200 of a blower motor according to the present invention are coupled. FIG. 12 is a perspective view of a blower motor according to the present invention illustrating a state in which a motor assembly 100 and a flange 200 are coupled by a damper plate 300.

As illustrated in FIGS. 11 and 12, the damper plate 300 comprises a ring-shaped body 310, a plurality of couplers 320 protruding upwardly from a periphery of the ring-shaped body 310 at regular intervals and having a coupling hole 321 in the center, and a protruding support 330 protruding inwardly of the ring-shaped body 310 in which the couplers 320 are disposed. Preferably, the ring-shaped body 310 is a plastic injection molded product. For reference, as used herein, the direction toward the shaft 10 of the motor assembly 100 is depicted as "upper portion," and accordingly, FIGS. 11 and 12 are illustrated upside down.

The damper plate 300 is coupled to the flange 200 by inserting the coupling protrusion 260 of the flange 200 into the coupling hole 321 in the coupler 320 of the damper plate 300 in a state where the motor assembly 100 is mounted on the flange 200. At the same time, the protruding support 330 of the damper plate 300 supports the receiving space S1 between the reinforcing piece 67A and the reinforcing piece 67B of the coupling reinforcing rib 67 in the motor cover 60, thereby preventing the motor assembly 100 from dislodging and allowing the motor assembly 100 to be rigidly coupled to the flange 200.

According to the present invention, the motor assembly 100 and the flange 200 are coupled by the damper plate 300 rigidly, and thus a blower motor can be manufactured by a more streamlined process.

Particularly, the rigid coupling of the motor assembly 100 and the flange 200 by the damper plate 300 improves waterproofing and air leakage prevention, and also absorbs vibration generated from the motor assembly 100, allowing the blower motor to be driven stably, thereby increasing the reliability of the motor quality.

It should be noted that the description of the present invention described above is merely an example for understanding the present invention, and is not intended to limit the scope of the present invention. It should be construed that the scope of the present invention is defined by the appended claims, and all modifications and alternations of the present invention fall within the protection scope of the present invention.

The invention claimed is:

1. A blower motor comprising:
   a motor assembly 100 which comprises a stator assembly 20, a rotor assembly 30 disposed on an outer periphery of the stator assembly 20 and rotating with a shaft 10, a stator block 40 coupled to the stator assembly 20, a printed circuit board 50 installed in the stator block 40; and a motor cover 60 coupled to the stator block 40;
   a flange 200 on which the motor assembly 100 is mounted; and
   a damper plate 300 coupled to the flange 200 and supporting the motor assembly 100,
   wherein the motor cover 60 has a plurality of receiving spaces S1 on the outer periphery at regular intervals, and the damper plate 300 has a plurality of protruding supports 330 which are received in the respective receiving spaces S1; and
   wherein the protruding support 330 in the damper plate 300 supports a receiving space S1 in the motor cover 60 for preventing the motor assembly 100 from dislodging, and
   wherein the damper plate 300 further comprises:
   a ring-shaped body 310; and
   a plurality of couplers 320 protruding upwardly from a periphery of the ring-shaped body 310 at regular intervals and having a coupling hole 321 in the center.

2. The blower motor of claim 1, wherein the flange 200 has a plurality of coupling protrusions 260 around a portion into which the motor assembly 100 is inserted at regular intervals, and the damper plate 300 has a plurality of couplers 320 which are coupled to the respective coupling protrusions 260.

3. The blower motor of claim 1, wherein the damper plate 300 is coupled to the flange 200 by inserting a coupling protrusion 260 in the flange 200 into the coupling hole 321 in the coupler 320 in a state where the motor assembly 100 is mounted on the flange 200.

* * * * *